United States Patent [19]
Kobayashi

[11] Patent Number: 4,481,924
[45] Date of Patent: Nov. 13, 1984

[54] ENGINE KNOCK DETECTING APPARATUS

[75] Inventor: Tatsuo Kobayashi, Aichi, Japan

[73] Assignee: Toyota Jidosha Kabushiki Kaisha, Toyota, Japan

[21] Appl. No.: 473,604

[22] Filed: Mar. 9, 1983

[30] Foreign Application Priority Data

Oct. 5, 1982 [JP] Japan .................... 57-174885

[51] Int. Cl.³ .................... F02P 5/04
[52] U.S. Cl. .................... 123/425; 123/435; 73/35
[58] Field of Search .................... 123/425, 435; 73/35

[56] References Cited

U.S. PATENT DOCUMENTS 4,233,944 11/1980 Omori .................... 123/425
4,276,861 7/1981 Kearney .................... 123/425
4,282,841 8/1981 Takagi .................... 123/425

Primary Examiner—Ronald B. Cox
Attorney, Agent, or Firm—Kenyon & Kenyon

[57] ABSTRACT

An engine knock detecting apparatus for sensing knocking occurring in an internal combustion engine. The engine knock detecting apparatus has a vibration sensor for sensing vibration having a vibration component caused by the knocking taking place in the engine and outputting an electric signal corresponding to the vibration. A feed back loop is formed by a first mean level detection circuit which determines and outputs the mean value of the electric signal derived from the vibration sensor, and a gain controller which controls the gain of an amplifier in accordance with the first mean level signal produced by the first mean level detection circuit, such that the amplified signal derived from the amplifier takes a level equal to or above a predetermined level. The amplified signal derived from the amplifier is compared by a comparator with a reference signal which is delivered through a second mean level detection circuit and a reference signal generator. A knocking signal representing the occurrence of engine knock is produced when the level of the reference signal is exceeded by the level of the amplified signal.

17 Claims, 6 Drawing Figures

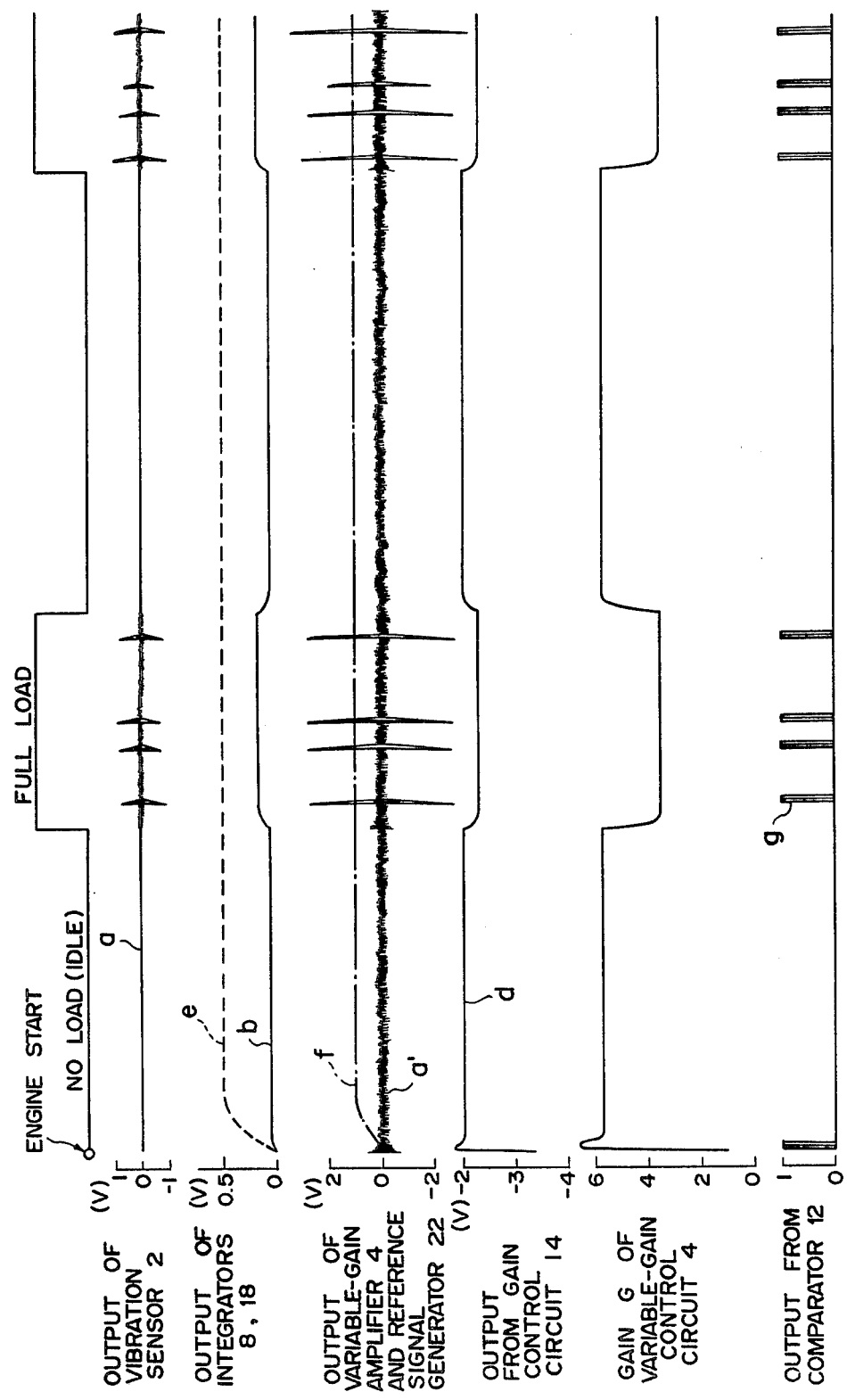

ENGINE KNOCK DETECTING APPARATUS

BACKGROUND OF THE INVENTION

The present invention relates to an engine knock detecting apparatus for sensing knocking occurring in an internal combustion engine. More particularly, the invention is concerned with an engine knock detecting apparatus for use in an anti-knocking device which is adapted to perform such a control as to delay the ignition timing upon sensing a knocking occurring in an internal combustion engine.

A typical conventional knock detecting apparatus has a vibration pickup for detecting vibration in an internal combustion engine, a full wave rectifier for making a full wave rectification of the output from the vibration pickup, an integrator for obtaining the mean value of the output from the full wave rectifier through integration of the output, an adder for adding a predetermined voltage to the output from the integrator thereby to produce and output a judgement reference signal, and a comparator adapted for comparing the output from the vibration pickup with the judgement reference signal.

In this knock detecting apparatus, therefore, the electric signal directly derived from the vibration pickup is compared with the judgement reference signal which is obtained from the vibration pickup indirectly through the full wave rectifier, integrator and adder, and a knocking signal representing the occurrence of the knocking is generated when the level of the reference signal is exceeded by the level of the electric signal directly derived from the vibration pickup. The level V of the voltage of the judgement reference level is given by the following formula (1).

$$V = Ka_o + b_o \qquad (1)$$

where, K represents a proportional constant, $a_o$ represents the level of electric signal and $b_o$ represents the level of the offset voltage which is added in the adder.

The peak value of the electric signal derived from the vibration pickup is increased in proportion to the increase of the engine speed and takes an extremely small level when the engine speed is low, as will be understood from FIG. 1. More specifically, in FIG. 1, a curve A shows the peak values of the output from the vibration pickup in relation to the engine speed as observed when there is no knocking taking place in the internal combustion engine, while curves B, C and D show the peak values as observed in the states of light, medium and heavy knocking taking place in the engine, respectively. Therefore, as an electric noise N, which is generated when the wiper is driven or when the headlight is put on, is picked up by, for example, the signal line between the vibration pickup and the full wave rectifier, the noise is superposed to the electric signal from the vibration pickup to make the electric output signal indistinguishable from the electric noise, particularly when the engine speed is low, resulting in a knock sensing failure or erroneous sensing of knocking occurring in the engine.

The erroneous sensing of knocking would be avoided if the judgement reference signal were selected to be sufficiently high as compared with the level of the electric noise. This, however, will impose a new problem of difficulty in the sensing of the engine knock of low level. It also requires considerable amplification of the electric signal produced by the vibration pickup, in order to sense even the small level of engine knock. In such a case, however, the electric signal derived from the vibration pickup during medium- and high-speed operation of the engine will become excessively large such as to exceed the dynamic range of the engine knock detecting apparatus to make the sensing of the engine knock materially impossible, particularly in the medium- and high-speed engine operation.

Another problem involved by the conventional engine knock detecting apparatus is that the engine knock detecting apparatus is required to have an impractically wide dynamic range in order to cover the entire range of engine operation including low-speed and high-speed engine operation, because the peak value of the electric signal derived from the vibration pickup is changed by a large value in response to a change in the engine speed.

SUMMARY OF THE INVENTION

Accordingly, it is a primary object of the invention to provide an engine knock detecting apparatus, improved to permit a highly accurate sensing of knocking over a wide range of engine operation including low-speed and high-speed regions, without necessitating any amplification of the dynamic range of the knock detecting apparatus while avoiding any unfavourable effect caused by electric noises, thereby to overcome the above-described problems of the prior art.

To this end, according to an aspect of the invention, a vibration sensor produces an electric signal corresponding to the vibration taking place in an internal combustion engine including vibration components caused by knocking occurring in the engine. A feed back loop is formed by a first mean level detecting circuit which is adapted to calculate the mean value of the level of the electric signal and to produce a first mean level signal, and a gain controller adapted to control the gain of an amplifier in accordance with the first mean level signal in such a manner as to maintain the level of the amplified signal at or above a predetermined level. The gain of the amplifier, which is adapted to amplify the electric signal and to produce a corresponding amplified signal, is controlled by the feed back loop. A reference signal is delivered through a second mean level detecting circuit and a reference signal generator. The amplified signal mentioned above is compared by a comparator with the reference signal, and a knocking signal is generated when the level of the amplified signal exceeds the level of the reference signal.

In the engine knock detecting apparatus of the invention summarized above, at least the vibration sensor and the amplifier may be preferably made unitary with each other, in order to further prevent the picking up of electric noise by the signal lines connected to the vibration sensor. In a more preferred form of the invention, the amplifier, first mean level detection circuit, gain controller, second mean level detection circuit, comparator and the vibration sensor are constructed in one body, i.e. as a unit with one another. The constituents of the engine knock detecting apparatus of the invention may be shielded magnetically or electrically. It is possible to use, as each of the first and second mean value detection circuits, a circuit having a series connection of a full wave rectifier circuit and an integration circuit. The gain controller may be constituted by a function generator or, alternatively, a series connection of an error detection circuit, incorporated in an embodiment which will be explained later, and a gain control circuit.

According to this arrangement, it is possible to maintain the level of the amplified signal derived from the amplifier at the same or higher level than the reference voltage, i.e. at the same or higher level than the electric noise, by a suitable control of the gain of the amplifier. It is, therefore, possible to detect any knocking in the engine over a wide range of engine operation covering low-speed and high-speed regions, however the level of the knocking may be low, without being influenced by the electric noise and without necessitating widening of the dynamic range of the engine knock detecting apparatus.

The above and other objects, features and advantages of the invention will become clear from the following description of the preferred embodiment taken in conjunction with the accompanying drawings.

BRIEF DESCRIPTION OF THE DRAWINGS

FIG. 6 is a diagram showing waveforms of signals available at essential parts of the engine knock detecting apparatus of the embodiment shown in the preceding Figures.

DESCRIPTION OF THE PREFERRED EMBODIMENT

The invention will be described in more detail hereinunder with reference to the accompanying drawings.

Figure 2:
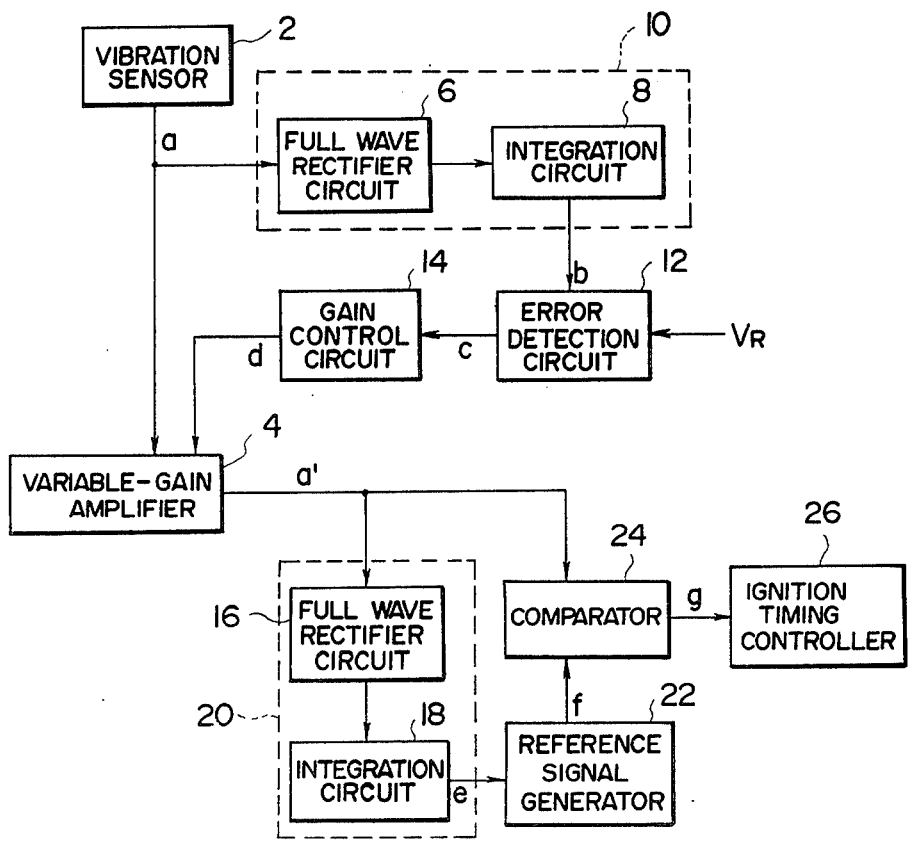
FIG. 2 is a block diagram of an engine knock detecting apparatus in accordance with an embodiment of the invention.

Referring first to FIG. 2 which is a basic block diagram of an engine knock detecting apparatus in accordance with an embodiment of the invention, a vibration sensor 2 constituted by, for example, a microphone is attached to the body of an internal combustion engine. The vibration sensor is adapted to convert the vibration of the engine into an electric signal. The vibration sensor 2 is connected at its output side directly to the input side of a variable-gain amplifier, the gain of which is controllable. The output end of the vibration sensor 2 is connected also indirectly to the variable-gain amplifier 4 through a first mean level detection circuit 10 composed of a full wave rectifier circuit 6 and an integration circuit 8, and through an error detection circuit 12 and a gain control circuit 14 which in combination constitute the gain controller. The error detection circuit 12 receive a reference signal of a level higher than the level of the electric noise. The output of the variable-gain amplifier 4 is connected directly to one of the input terminals of the comparator 24 and indirectly to the other of the input terminals of the same comparator 24 through a second mean level detection circuit 20 constituted by a full wave rectifier circuit 16 and an integration circuit 18 and through a reference signal generator 22 constituted by an amplifier, an adder and so forth.

The comparator 24 is connected at its output side to an ignition timing controller 26 which is adapted to control the ignition timing in such a manner as to advance the ignition timing when no knocking is taking place and to delay the ignition timing when a knocking is taking place.

Figure 3:
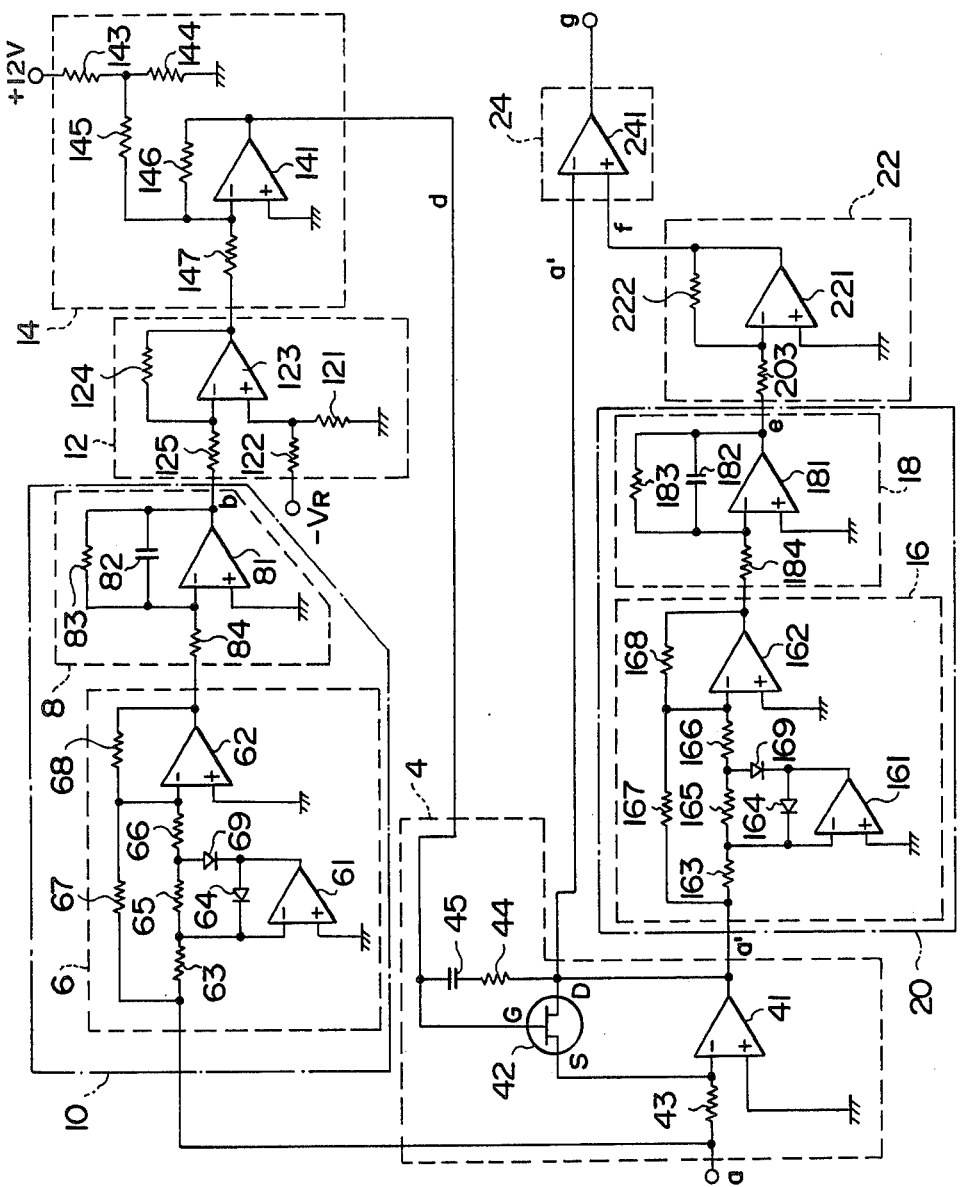
FIG. 3 is a circuit diagram of the embodiment shown in FIG. 2.

Referring now to FIG. 3 showing the circuit arrangement of an essential part of the engine knock detecting apparatus of the invention, a variable-gain amplifier 4 is provided with an operation amplifier 41 and a field effect transistor 42. The plus (+) terminal of the operation amplifier 41 is directly grounded, while the minus (−) terminal of the same is connected to the vibration sensor 2 through a resistor 43 which is, in the described embodiment, has a resistance value of 1.1 K-ohm. The vibration sensor 2 on the other hand is connected to a first full wave rectifier circuit 6. The output of the operation amplifier 41 is connected to a second full wave rectifier circuit 16 and also to one of the input terminals of an operation amplifier 241 which is a constituent of the comparator 24, as well as to the collecter of the field effect transistor 42. The field effect transistor 42 has a gate connected to a gain control circuit 14 and also to the collecter through a capacitor 45 and a resistor 44. The source of the field effect transistor 42 is connected to an input terminal of the operation amplifier 41.

The first full wave rectifier circuit 6 has operation amplifiers 61 and 62, the plus (+) terminals of which are grounded. The vibration sensor 2 is connected to an input terminal of the operation amplifier 61 through a resistor 63. Also, the output of the operation amplifier 61 is connected to the same terminal through a diode 64. The vibration sensor 2 is connected also to an input terminal of the operation amplifier 62, through resistors 63, 65 and 66. The vibration sensor 2 is connected to the same terminal through a resistor 67 which is connected in parallel to the above-mentioned resistors 63, 65 and 66. This terminal of the operation amplifier 62 is connected to the output of the same operation amplifier through a resistor 68. The juncture between the resistors 65 and 66 is connected to the output of the operation amplifier 61 through a diode 69. The output of the operation amplifier 62 is connected to the first integration circuit 8.

The first integration circuit 8 is provided with an operation amplifier 81, connected to which is the plus (+) terminal. The output of the operation amplifier 81 is connected to the error detection circuit 12 and also to one input terminal of an operation amplifier 81 through a capacitor 82 and a resistor 83 which are connected in parallel with each other. The output of the operation amplifier 62 in the full wave rectifier circuit 6 is connected to the same terminal of the operation amplifier 81 through a resistor 84. In the described embodiment, the capacitor 82 and the resistor 84 are so adjusted as to provide an integration time constant of about 200 mS.

The error detection circuit 12 is a differential amplifier having an operation amplifier 123, the plus (+) terminal of which is grounded through the resistor 121. A reference voltage $V_R$, e.g. 500 mV, higher than the level of the electric noise is applied through a resistor 122 to the plus (+) terminal of the operation amplifier 123, after an inversion of the polarity. The output of the operation amplifier 123 is connected to the gain control circuit 14 and also to an input terminal of the operation amplifier 123 through a resistor 124. Furthermore, the output of the operation amplifier 81 in the first integration circuit 8 is connected to the same terminal of the operation amplifier 123 through a resistor 125. In this embodiment, the resistors 124 and 125 are adjusted beforehand such that the differential amplifier has a gain value of 3 (three).

The gain control circuit 14 is composed of an operation amplifier 141 grounded at its plus (+) terminal and a series circuit composed of resistors 143 and 144 connected in series to each other. The gain controller 14 is an inversion adder having a potential dividing circuit which is connected at its one end to a power supply of, for example, 12V and grounded at its other end. This potential dividing circuit is intended for applying an offset to the gate voltage of the field effect transistor 42. In the illustrated embodiment, resistors 143 and 144 are adjusted to provide an offset voltage of 3.4 V. An operation amplifier 123 in the error detection circuit 12 is connected at its output to an input terminal of the operation amplifier 141 through a resistor 147. The output of the operation amplifier 141 is connected to the gate of the field effect transistor 42 in the variable-gain amplifier 4 and also to an input terminal of the same operation amplifier 141 through a resistor 146. Furthermore, the juncture between the resistors 143 and 144 is connected through a resistor 145 to the above-mentioned terminal of the operation amplifier 141 to apply an offset voltage thereto.

A second full wave rectifier circuit 16 has a circuit arrangement similar to that of the first full wave rectifier circuit 6, composed of operation amplifiers 61,162, resistors 163,165,166,167 and 168, and diodes 164 and 169. The operation amplifier 41 provided in the variable-gain control circuit 4 is connected at its output to an input terminal of the operation amplifier 161 through a resistor 163. The output of the operation amplifier 162 is connected to a second integration circuit 18. The second integration circuit 18 has a similar circuit arrangement to the first integration circuit 8, composed of an operation ampifier 181, capacitor 182, and resistors 183 and 184. The output of the operation amplifier 162 provided in the second full wave rectifier circuit 16 is connected through a resistor 184 to one of the input terminals of the operation amplifier 181 the output of which is connected to the reference signal generator 22. The capacitor 182 and the resistor 184 are so adjusted to provide a time constant of the second integration circuit of about 400 mS, which is somewhat longer than that of the first integration circuit.

The reference signal generator 22 has an operation amplifier 221, the plus (+) terminal of which is grounded. The output of the operation amplifier 221 is connected to the plus (+) terminal of an operation amplifier 241 which is a constituent of the comparator 24 and also to an input terminal of the operation amplifier 221 through a resistor 222. Furthermore, the output of the operation amplifier 181 provided in the second integration circuit 18 is connected to the same input terminal of the operation amplifier 221 through a resistor 203.

Figure 4:
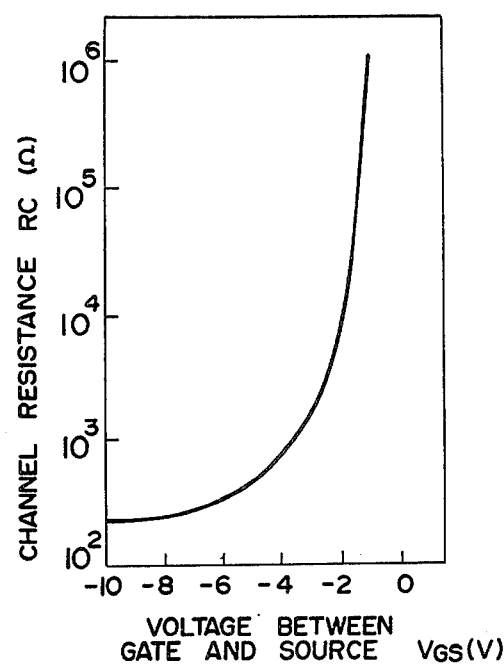
FIG. 4 is a diagram showing the relationship between the channel resistance and the voltage differential between gate and source of a transistor.

FIG. 4 shows the relationship between the channel resistance Rc and the voltage $V_{GS}$ between the gate and source of the field effect transistor. The data shown in FIG. 4 has been obtained with a field effect transistor manufactured and sold by SONY Corporation under the commercial name of TX-429D.

Representing the resistance value of the resistor 43 of the variable-gain amplifier 4 by R, the gain G of the variable-gain amplifier 4 is expressed by the following formula (2).

$$G = Rc/R \tag{2}$$

When the first mean level signal, i.e. the output b from the first integrator 8, takes a level below the reference voltage $V_R$, the voltage $V_{GS}$ between the gain and source takes a large value to increase the channel resistance Rc and, hence, the gain G. To the contrary, when the reference voltage $V_R$ is exceeded by the first mean level signal b, the gate source voltage $V_{GS}$ becomes smaller to reduce the gain G. Thus, a feed back control is effected to optimize the gain G of the variable-gain amplifier 4.

Figure 1:
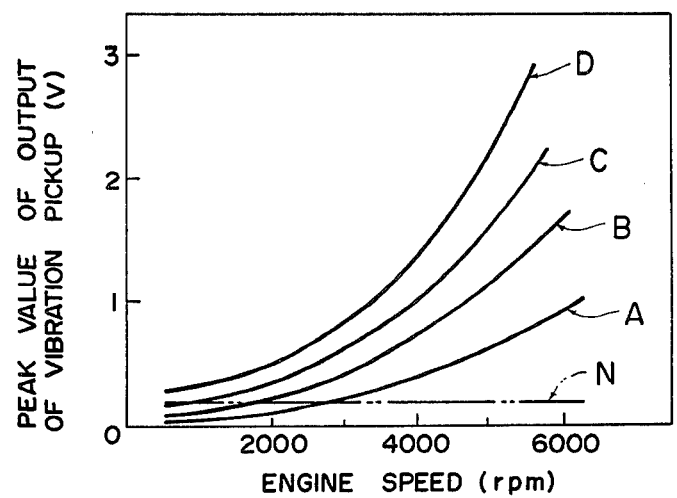
FIG. 1 is a diagram showing the relationship between the engine speed and the peak value of the output from the vibration pickup.
Figure 5:
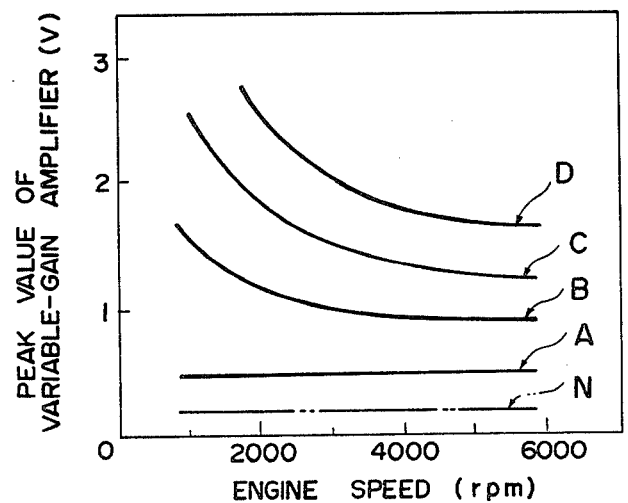
FIG. 5 is a diagram showing how the peak value of the output from a variable-gain amplifier is varied in accordance with the engine speed.

FIG. 5 shows the peak values of the outputs from the variable-gain amplifier for various levels of knocking taking place in the engine in relation to the engine speed. Symbols N,A,B,C and D represent different levels of knocking taking place in the engine, the same as those mentioned before in connection with FIG. 1.

The operation of the engine knock detecting apparatus of this embodiment will be explained with specific reference to FIG. 6 which shows the waveforms of signals available at major parts of the embodiment shown in FIG. 3.

The vibration occurring in the engine is sensed by the vibration sensor 2 which in turn produces an electric signal a having amplitude and frequency corresponding to those of the vibration. This electric signal a is inputted to the variable-gain amplifier 4 and is fed back to the variable-gain amplifier 4 through the first full wave rectifier circuit 6, first integration circuit 8, error detection circuit 12 and the gain control circuit 14, thereby to control the gain of the variable-gain amplifier 4. More specifically, the first full wave rectifier circuit 6 and the first integration circuit 8 in combination provide a first mean level signal b which represents the mean level of the electric signal a derived from the vibration sensor 2. The first mean level signal b is compared in the error detection circuit 12 with the reference voltage $V_R$. A voltage which is three times as high as the difference between the first mean level signal b and the reference voltage $V_R$ is added in the gain control circuit 14 to the offset voltage of 3.4 V to determine the level of the output signal d of the gain control circuit 14, i.e. the gate voltage. As a result, the channel resistance Rc is changed to determine the gain G of the variable-gain amplifier 4 as shown in FIG. 6, and the variable-gain amplifier 4 delivers an output signal a' which is obtained through amplification of the output signal a. Upon receipt of the output signal a', the second full wave rectifier circuit 16 and the second integrator circuit 18 operate to determine the second mean level signal e which is given as the output from the second integration circuit 18. At the same time, the judging level signal f is determined and given as the output from the reference signal generator 22. Then, the output signal a' from the variable-gain amplifier 4 and the output signal f from the reference signal generator 22 are compared with each other by the comparator 24. When the level of the output signal f is exceeded by the level of the output signal a', the comparator 24 produces and delivers knock pulses g as its output. The knock pulses g are delivered to the ignition timing control circuit 26 including a delaying circuit. Upon receipt of the knock pulses g, the ignition timing control circuit 26 corrects or amends, in accordance with the number of the knock pulses g received, the basic ignition signal which has been determined beforehand, and controls the igniter to delay the ignition timing.

To explain in more detail, the vibration sensor 2 commences to output the vibration signal corresponding to the vibration in the engine as the engine is started. The output level from the first integrator 8, however, is almost zero volt in the period immediately after the start up of the engine, because the first integrator 8 has a comparatively large integration time constant of 200 mS, so that the voltage which is obtained through multiplying the reference voltage $V_R$ (−0.5V) by 3 (three), i.e. −4.5 V, is added to the offset voltage which is 3.4 V to reduce the offset voltage down to 1.9 V. Then, a voltage obtained through an inversion of the thus obtained offset voltage, i.e. −1.9 V, is applied to the gate of the field effect transistor 42 so that the latter exhibits a channel resistance $R_C$ of about 10 K-ohm. In this case, therefore, the gain G of the variable-gain amplfier 4 is about 9.1 which is obtained through dividing the channel resistance of 10 K-ohm by 1.1K.

As the output from the first integrator 8 gradually approaches a predetermined level at which a balance is obtained between the integeration time constant and the discharge time constant, the predetermined level being 0.05 V in the unloaded condition, the gate voltage gradually approaches 2.05 V as will be understood from the following formula (3).

$$(0.05-0.5)\times 3+3.4=2.05[V] \quad (3)$$

As a result, the channel resistance Rc takes a value of 6.3 K-ohm and the value of the gain G gradually approaches 5.7 as will be seen from the following formula (4).

$$G = 6.3\text{K-ohm}/1.1\text{K-ohm} = 5.7 \quad (4)$$

As the load is gradually increased from no load which provides a small output of the vibration sensor 2 to full load which provides a large output from the same, the gain G of the variable-gain controller 4 is gradually changed from 5.7 which is obtained under no-load condition to 3.5 which is obtained under full load.

As will be seen from FIG. 4, the channel resistance of the field effect transistor is changed in accordance with a change in the voltage between the gate and source and, hence, is largely affected by the level of the offset voltage of the gain control circuit 14. Actually, however, the gain of the variable-gain amplifier may become excessively large in the low-speed operation of the engine and excessively small in the medium- and high-speed operation of the engine. To avoid such an inconvenience, it is necessary to suitably select the offset voltage of the reference signal generator 22.

Although the invention has been described through a specific embodiment, it is to be noted that the described embodiment is not exclusive and various changes and modifications may be imparted thereto without departing from the scope of the invention which is limited solely by the appended claim.

What is claimed is:

1. An engine knock detecting apparatus for sensing knocking occurring in an internal combustion engine comprising:

a vibration sensor for sensing vibration in said engine and for producing an electric signal corresponding to the vibration in said engine, said vibration having a vibration component caused by the knocking;

a variable-gain amplifier the gain of which is controllable, for producing an amplified output through an amplification of said electric signal in accordance with the controlled gain;

a first mean level detecting circuit for determining and outputting a first mean level signal which is the mean value of the level of said electric signal;

a gain controller for controlling the gain of said amplifier in accordance with the first mean level signal so as to maintain said amplified output at a level equal to or above a predetermined level;

a second mean level detecting circuit for determining and outputting a second mean level signal which is the mean value of said amplified signal;

a reference signal generator for producing and outputting a reference signal by adding a predetermined voltage to said second mean level signal; and a comparator for outputting a knocking signal when the level of said amplified signal exceeds the level of said reference signal.

2. An engine knock detecting apparatus according to claim 1, wherein said gain controller includes a series circuit having an error detection circuit and a gain control circuit which are connected in series to each other.

3. An engine knock detecting apparatus according to claim 1, wherein said gain controller includes a function generator.

4. An engine knock detecting apparatus according to claim 1, wherein said first mean level detecting circuit includes a series circuit having a full wave rectifier circuit and an integration circuit connected to each other.

5. An engine knock detecting apparatus according to claim 1, wherein said second mean level detecting circuit includes a series circuit having a full wave rectifier circuit and an integration circuit connected in series to each other.

6. An engine knock detecting apparatus according to claim 1, wherein said vibration sensor and said amplifier are constructed as a single physical unit.

7. An engine knock detecting apparatus according to claim 1, wherein said vibration sensor, amplifier, first mean level detecting circuit, gain controller, second mean level detecting circuit and said comparator are constructed as a unit.

8. An engine knock detecting apparatus according to claim 1, wherein said vibration sensor, amplifier, first mean level detecting circuit, gain controller, second mean level detecting circuit, reference signal generator and said comparator are shielded electrically.

9. An engine knock detecting apparatus according to claim 1, wherein said vibration sensor, amplifier, first mean level detecting circuit, gain controller, second mean level detecting circuit, reference signal generator and said comparator are shielded magnetically.

10. An engine knock detecting apparatus according to claim 1, wherein the constituents are connected through signal lines which are shielded electrically.

11. An engine knock detecting apparatus according to claim 1, wherein the constituents are connected through signal lines which are shielded magnetically.

12. An engine knock detecting apparatus according to claim 4, wherein said integration circuit has an integration time constant of about 200 mS.

13. An engine knock detecting apparatus according to claim 5, wherein said integration circuit has an integration time constant of about 400 mS.

14. An engine knock detecting apparatus according to claim 1, wherein said gain controller is adapted to produce an output which is obtained through comparing the output from said first mean level detecting circuit with a reference voltage, multiplying the difference by a proportional constant and then adding an offset value to the product of the difference and proportional constant.

15. An engine knock detecting apparatus according to claim 14, wherein said proportional constant is 3.

16. An engine knock detecting apparatus according to claim 14, wherein said offset value is 3.4 V.

17. An engine knock detecting apparatus according to claim 14, wherein said reference voltage is 0.5 V.

* * * * *